US007716592B2

(12) United States Patent
Tien et al.

(10) Patent No.: US 7,716,592 B2
(45) Date of Patent: May 11, 2010

(54) AUTOMATED GENERATION OF DASHBOARDS FOR SCORECARD METRICS AND SUBORDINATE REPORTING

(75) Inventors: Ian Tien, Seattle, WA (US); Catalin I. Tomai, Bellevue, WA (US); Chen-I Lim, Bellevue, WA (US); Corey Hulen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 11/393,019

(22) Filed: Mar. 30, 2006

(65) Prior Publication Data

US 2007/0239573 A1  Oct. 11, 2007

(51) Int. Cl.
*G06F 3/00* (2006.01)
*G06F 3/14* (2006.01)

(52) U.S. Cl. .................. 715/744; 715/788; 715/810; 715/765

(58) Field of Classification Search .................. 715/733, 715/744–747, 764, 765, 781, 788, 866, 243, 715/810, 205; 709/201, 203, 223, 224; 705/35
See application file for complete search history.

(56) References Cited

U.S. PATENT DOCUMENTS

| | | | |
|---|---|---|---|
| 5,018,077 A | 5/1991 | Healey | 715/509 |
| 5,253,362 A | 10/1993 | Nolan | 707/1 |
| 5,473,747 A | 12/1995 | Bird | 715/848 |
| 5,675,553 A | 10/1997 | O'Brien, Jr. et al. | 367/135 |
| 5,680,636 A | 10/1997 | Levine | 715/512 |
| 5,758,351 A | 5/1998 | Gibson et al. | 707/104 |
| 5,797,136 A | 8/1998 | Boyer et al. | 707/2 |
| 5,832,504 A | 11/1998 | Tripathi et al. | 715/235 |
| 5,845,270 A | 12/1998 | Schatz | 706/11 |
| 5,926,794 A | 7/1999 | Fethe | 705/11 |
| 5,956,691 A | 9/1999 | Powers | 705/4 |
| 6,012,044 A | 1/2000 | Maggioncalda et al. | 705/36 R |
| 6,023,714 A | 2/2000 | Hill et al. | 715/235 |
| 6,119,137 A | 9/2000 | Smith et al. | 715/234 |
| 6,141,655 A | 10/2000 | Johnson | 707/2 |
| 6,163,779 A | 12/2000 | Mantha | 707/100 |
| 6,182,022 B1 | 1/2001 | Mayle et al. | 702/182 |
| 6,216,066 B1 | 4/2001 | Goebel et al. | 701/29 |
| 6,230,310 B1 | 5/2001 | Arrouye et al. | 717/136 |
| 6,233,573 B1 | 5/2001 | Bair | 707/3 |

(Continued)

FOREIGN PATENT DOCUMENTS

EP    1 128 299 A1    8/2001

(Continued)

OTHER PUBLICATIONS

U.S. Official Action mailed Dec. 24, 2008 in U.S. Appl. No. 11/624,171.

(Continued)

*Primary Examiner*—X. L Baustista
(74) *Attorney, Agent, or Firm*—Merchant & Gould

(57) ABSTRACT

An interactive dashboard providing scorecard presentation with subordinate reports is automatically generated and configured based on centrally managed metadata definitions. The dashboard may be customized based on subscriber credentials, past preferences, and the like. The dashboard may be deployed to one or more locations to be consumed and further customized by end users.

20 Claims, 9 Drawing Sheets

U.S. PATENT DOCUMENTS

| | | |
|---|---|---|
| 6,249,784 B1 | 6/2001 | Macke ............................ 707/3 |
| 6,308,206 B1 | 10/2001 | Singh .......................... 709/223 |
| 6,321,206 B1 | 11/2001 | Honarvar ........................ 705/7 |
| 6,345,279 B1 | 2/2002 | Li et al. ........................ 715/202 |
| 6,389,434 B1 | 5/2002 | Rivette ........................ 715/512 |
| 6,393,406 B1 | 5/2002 | Eder ............................... 705/7 |
| 6,421,670 B1 | 7/2002 | Fourman ...................... 707/10 |
| 6,493,733 B1 | 12/2002 | Pollack ........................ 707/513 |
| 6,516,324 B1 | 2/2003 | Jones ........................ 707/104.1 |
| 6,519,603 B1 | 2/2003 | Bays ........................... 707/102 |
| 6,529,215 B2 | 3/2003 | Golovchinsky et al. ...... 715/764 |
| 6,578,004 B1 | 6/2003 | Cimral .......................... 705/36 |
| 6,628,312 B1 | 9/2003 | Rao ............................. 715/853 |
| 6,658,432 B1 | 12/2003 | Alavi et al. ................. 707/104.1 |
| 6,677,963 B1 | 1/2004 | Mani et al. .................. 715/764 |
| 6,687,878 B1 | 2/2004 | Eintracht ..................... 712/512 |
| 6,772,137 B1 | 8/2004 | Hurwood et al. ............... 707/2 |
| 6,775,675 B1 | 8/2004 | Nwabueze ................... 707/100 |
| 6,831,575 B2 | 12/2004 | Wu et al. ........................ 341/50 |
| 6,831,668 B2 | 12/2004 | Cras ............................ 715/853 |
| 6,842,176 B2 | 1/2005 | Sang'Udi ..................... 345/440 |
| 6,850,891 B1 | 2/2005 | Forman ........................... 705/7 |
| 6,859,798 B1 | 2/2005 | Bedell et al. ................... 706/45 |
| 6,874,126 B1 | 3/2005 | Lapidous ..................... 715/711 |
| 6,898,603 B1 | 5/2005 | Petculescu ................... 707/101 |
| 6,900,808 B2 | 5/2005 | Lassiter ....................... 345/440 |
| 6,959,306 B2 | 10/2005 | Nwabueze ................. 707/104.1 |
| 6,963,826 B2 | 11/2005 | Hanaman et al. ................ 703/2 |
| 6,968,312 B1 | 11/2005 | Jordan et al. ..................... 705/7 |
| 6,973,616 B1 | 12/2005 | Cottrille ....................... 715/512 |
| 6,988,076 B2 | 1/2006 | Ouimet ............................ 705/7 |
| 6,995,768 B2 | 2/2006 | Jou .............................. 345/440 |
| 7,013,285 B1 | 3/2006 | Rebane ........................ 705/10 |
| 7,015,911 B2 | 3/2006 | Shaughnessy et al. ....... 345/440 |
| 7,027,051 B2 | 4/2006 | Alford et al. ................. 345/440 |
| 7,058,638 B2 | 6/2006 | Singh .......................... 707/100 |
| 7,181,417 B1 | 2/2007 | Langseth et al. ............... 705/26 |
| 7,349,862 B2 | 3/2008 | Palmer et al. .................... 705/7 |
| 7,412,398 B1 | 8/2008 | Bailey .......................... 705/10 |
| 7,440,976 B2 | 10/2008 | Chan et al. .................. 707/203 |
| 7,496,852 B2 | 2/2009 | Eichorn et al. ............... 715/764 |
| 7,509,343 B1 | 3/2009 | Washburn et al. ........ 707/104.1 |
| 7,587,665 B2 | 9/2009 | Crow et al. ................... 715/212 |
| 7,599,848 B2 | 10/2009 | Wefers et al. ................... 705/7 |
| 7,613,625 B2 | 11/2009 | Heinrich ......................... 705/7 |
| 2001/0004256 A1 | 6/2001 | Iwata et al. .................. 345/204 |
| 2001/0054046 A1 | 12/2001 | Mikhailov et al. .......... 707/500 |
| 2002/0038217 A1 | 3/2002 | Young ............................ 705/1 |
| 2002/0049621 A1 | 4/2002 | Bruce ............................. 705/7 |
| 2002/0052740 A1 | 5/2002 | Charlesworth .............. 704/220 |
| 2002/0059267 A1 | 5/2002 | Shah ............................ 707/100 |
| 2002/0078175 A1 | 6/2002 | Wallace ....................... 709/200 |
| 2002/0087272 A1 | 7/2002 | Mackie ......................... 702/14 |
| 2002/0091737 A1 | 7/2002 | Markel ......................... 707/513 |
| 2002/0099578 A1 | 7/2002 | Eicher et al. .................... 705/7 |
| 2002/0133368 A1 | 9/2002 | Strutt et al. ..................... 705/1 |
| 2002/0169658 A1 | 11/2002 | Adler ........................... 705/10 |
| 2002/0169799 A1 | 11/2002 | Voshell ........................ 707/503 |
| 2002/0194042 A1 | 12/2002 | Sands ............................. 705/7 |
| 2002/0194090 A1* | 12/2002 | Gagnon et al. ................ 705/27 |
| 2002/0194329 A1 | 12/2002 | Alling ......................... 709/224 |
| 2003/0004742 A1 | 1/2003 | Palmer et al. ................... 705/1 |
| 2003/0028419 A1 | 2/2003 | Monaghan .................... 705/10 |
| 2003/0040936 A1 | 2/2003 | Nader et al. .................... 705/1 |
| 2003/0069773 A1 | 4/2003 | Hladik et al. ................... 705/7 |
| 2003/0093423 A1 | 5/2003 | Larason et al. .................. 707/5 |
| 2003/0110249 A1* | 6/2003 | Buus et al. ................... 709/224 |
| 2003/0144868 A1 | 7/2003 | MacIntyre et al. ............. 705/1 |
| 2003/0146937 A1 | 8/2003 | Lee ............................. 345/781 |
| 2003/0182181 A1 | 9/2003 | Kirkwood ..................... 705/11 |
| 2003/0187675 A1 | 10/2003 | Hack ............................. 705/1 |
| 2003/0204430 A1 | 10/2003 | Kalmick et al. ................. 705/8 |
| 2003/0204487 A1 | 10/2003 | Sssv ............................... 707/1 |
| 2003/0212960 A1 | 11/2003 | Shaughnessy et al. ....... 715/526 |
| 2003/0225604 A1 | 12/2003 | Casati et al. ..................... 705/7 |
| 2003/0226107 A1 | 12/2003 | Pelegri-Llopart ......... 707/501.1 |
| 2004/0030741 A1 | 2/2004 | Wolton et al. ............... 709/202 |
| 2004/0030795 A1 | 2/2004 | Hesmer et al. .............. 709/231 |
| 2004/0033475 A1 | 2/2004 | Mizuma et al. ............. 434/219 |
| 2004/0059518 A1 | 3/2004 | Rothschild ................... 702/18 |
| 2004/0068429 A1 | 4/2004 | MacDonald .................. 705/10 |
| 2004/0083246 A1 | 4/2004 | Kahlouche et al. .......... 708/105 |
| 2004/0093296 A1 | 5/2004 | Phelan et al. ............. 705/36 R |
| 2004/0102926 A1 | 5/2004 | Adendorff .................... 702/182 |
| 2004/0117731 A1 | 6/2004 | Blyashov ..................... 715/507 |
| 2004/0128150 A1 | 7/2004 | Lundegren ................... 705/35 |
| 2004/0138944 A1 | 7/2004 | Whitacre ..................... 705/11 |
| 2004/0162772 A1 | 8/2004 | Lewis .......................... 705/34 |
| 2004/0164983 A1 | 8/2004 | Khozai ........................ 345/440 |
| 2004/0172323 A1 | 9/2004 | Stamm ........................ 705/10 |
| 2004/0183800 A1 | 9/2004 | Peterson ..................... 345/440 |
| 2004/0204913 A1 | 10/2004 | Mueller et al. .............. 702/188 |
| 2004/0210574 A1 | 10/2004 | Aponte et al. ................. 707/5 |
| 2004/0225571 A1 | 11/2004 | Urali ............................ 705/26 |
| 2004/0225955 A1* | 11/2004 | Ly ............................... 715/500 |
| 2004/0230463 A1 | 11/2004 | Boivin ........................... 705/7 |
| 2004/0230471 A1 | 11/2004 | Putnam ........................ 705/10 |
| 2004/0249482 A1 | 12/2004 | Abu El Ata et al. ........... 700/44 |
| 2004/0252134 A1 | 12/2004 | Bhatt et al. ................. 345/619 |
| 2004/0260582 A1 | 12/2004 | King ............................. 705/7 |
| 2004/0268228 A1 | 12/2004 | Croney et al. ............... 715/255 |
| 2005/0012743 A1 | 1/2005 | Kapler et al. ................ 345/419 |
| 2005/0039119 A1 | 2/2005 | Parks et al. .................. 715/515 |
| 2005/0049894 A1 | 3/2005 | Cantwell et al. ............... 705/1 |
| 2005/0055257 A1 | 3/2005 | Senturk et al. .................. 705/8 |
| 2005/0060048 A1 | 3/2005 | Pierre .......................... 700/28 |
| 2005/0060325 A1 | 3/2005 | Bakalash ..................... 707/100 |
| 2005/0065967 A1 | 3/2005 | Schuetze et al. ............ 707/102 |
| 2005/0071737 A1 | 3/2005 | Adendorff .................... 715/500 |
| 2005/0091093 A1 | 4/2005 | Bhaskaran ...................... 705/7 |
| 2005/0091253 A1 | 4/2005 | Cragun ........................ 707/102 |
| 2005/0091263 A1 | 4/2005 | Wallace ....................... 707/102 |
| 2005/0097438 A1 | 5/2005 | Jacobson ................. 715/500.1 |
| 2005/0108271 A1 | 5/2005 | Jacobson ..................... 715/202 |
| 2005/0114241 A1 | 5/2005 | Hirsch ......................... 705/35 |
| 2005/0114801 A1 | 5/2005 | Yang ............................ 715/961 |
| 2005/0149558 A1 | 7/2005 | Zhuk ....................... 707/104.1 |
| 2005/0149852 A1 | 7/2005 | Bleicher ..................... 715/500 |
| 2005/0154628 A1 | 7/2005 | Eckart et al. ................. 705/10 |
| 2005/0160356 A1 | 7/2005 | Albornoz .................... 715/512 |
| 2005/0171835 A1 | 8/2005 | Mook .......................... 705/11 |
| 2005/0198042 A1 | 9/2005 | Davis .......................... 707/10 |
| 2005/0216831 A1 | 9/2005 | Guzik ......................... 715/513 |
| 2005/0240467 A1 | 10/2005 | Eckart ......................... 705/10 |
| 2005/0256825 A1 | 11/2005 | Dettinger ....................... 707/1 |
| 2005/0272022 A1 | 12/2005 | Montz, Jr. et al. ........... 434/322 |
| 2005/0273762 A1 | 12/2005 | Lesh ........................... 715/804 |
| 2005/0289452 A1 | 12/2005 | Kashi ......................... 715/512 |
| 2006/0004555 A1 | 1/2006 | Jones ............................ 703/6 |
| 2006/0004731 A1 | 1/2006 | Seibel et al. .................... 707/3 |
| 2006/0009990 A1 | 1/2006 | McCormick .................. 705/1 |
| 2006/0010032 A1 | 1/2006 | Eicher et al. ................. 705/10 |
| 2006/0036455 A1 | 2/2006 | Prasad .......................... 715/1 |
| 2006/0059107 A1 | 3/2006 | Elmore et al. ................. 705/64 |
| 2006/0089894 A1 | 4/2006 | Balk et al. ..................... 705/35 |
| 2006/0089939 A1 | 4/2006 | Broda et al. ................. 707/100 |
| 2006/0095915 A1* | 5/2006 | Clater .......................... 718/100 |
| 2006/0112123 A1 | 5/2006 | Clark et al. ................. 707/101 |
| 2006/0112130 A1 | 5/2006 | Lowson ...................... 707/102 |
| 2006/0123022 A1 | 6/2006 | Bird ........................... 707/100 |
| 2006/0167704 A1 | 7/2006 | Nicholls et al. ................ 705/1 |
| 2006/0178897 A1 | 8/2006 | Fuchs ............................ 705/1 |
| 2006/0178920 A1 | 8/2006 | Muell ............................ 705/8 |
| 2006/0195424 A1 | 8/2006 | Wiest et al. .................... 707/3 |

| | | | |
|---|---|---|---|
| 2006/0206392 A1 | 9/2006 | Rice, Jr. et al. | 705/26 |
| 2006/0229925 A1 | 10/2006 | Chalasani et al. | 705/8 |
| 2006/0233348 A1 | 10/2006 | Cooper | 379/265.06 |
| 2006/0235778 A1 | 10/2006 | Razvi et al. | 705/35 |
| 2007/0033129 A1* | 2/2007 | Coates | 705/36 R |
| 2007/0038934 A1 | 2/2007 | Fellman | 715/700 |
| 2007/0050237 A1 | 3/2007 | Tien et al. | 705/11 |
| 2007/0055688 A1 | 3/2007 | Blattner | 707/102 |
| 2007/0174330 A1 | 7/2007 | Fox et al. | 707/102 |
| 2008/0172287 A1 | 7/2008 | Tien et al. | 705/10 |
| 2008/0172348 A1 | 7/2008 | Tien et al. | 706/12 |
| 2008/0172414 A1 | 7/2008 | Tien et al. | 707/104.1 |
| 2008/0172629 A1 | 7/2008 | Tien et al. | 715/771 |
| 2008/0183564 A1 | 7/2008 | Tien et al. | 705/11 |
| 2008/0184099 A1 | 7/2008 | Tien et al. | 715/209 |
| 2008/0184130 A1 | 7/2008 | Tien et al. | 715/745 |
| 2008/0189632 A1 | 8/2008 | Tien et al. | 715/764 |
| 2008/0189724 A1 | 8/2008 | Tien et al. | 719/329 |

FOREIGN PATENT DOCUMENTS

| | | |
|---|---|---|
| EP | 1050829 | 3/2006 |
| WO | WO 97/31320 A1 | 8/1997 |
| WO | WO 01/65349 A1 | 9/2001 |
| WO | WO 01/69421 A2 | 9/2001 |
| WO | WO 01/69421 A3 | 9/2001 |
| WO | WO 03/037019 A1 | 5/2003 |
| WO | WO0101206 | 1/2004 |
| WO | WO 2004/114177 A2 | 12/2004 |
| WO | WO 2004/114177 A3 | 12/2004 |
| WO | WO 2005/062201 A1 | 7/2005 |
| WO | WO 2005/101233 A1 | 10/2005 |

OTHER PUBLICATIONS

Kraynak, "Absolute Beginner's Guide to Microsoft Office Excel 2003", Que, Sep. 2003, 32 pp.

U.S. Office Action dated Feb. 18, 2009 cited in U.S. Appl. No. 11/412,434.

Bajwa, Deepinder S.; Lewis, L. Floyd; Pervan, Graham; Lai, Vincent S., "An Empirical Assessment of the Adoption and Use of Collaboration Information Technologies in the US, Australia, and Hong Kong", Department of Decision Sciences, College of Business and Economics, Western Washington University, Bellingham, WA USA; School of Information Systems, Curtin University of Technology, Perth, WA, Australia; Faculty of Business Administration, The Chinese University of Hong Kong; Satin, N.T., Hong Kong, http://dsslab.sims.monash.edu.au/dss2004/proceedings/pdf/07_Bajwa_Lewis_Pervan_Lai.pdf, pp. 60-69.

Epicor Vantage, "Introducing the Next Generation Global Enterprise Resource Planning Software", http://www.scala.com.cn/downloads/vantage/vantage_60_page.pdf, pp. 1-56.

Badii, Atta; Sharif, Amir, "Information Management and Knowledge Integration for Enterprise Innovation", http://www.emeraldinsight.com/Insight/ViewContentServlet?Filename=Published/EmeraldFullTextArticle/Pdf/0880160205.pdf, pp. 145-155.

U.S. Official Action mailed May 28, 2009 in U.S. Appl. No. 11/280,548.

U.S. Official Action mailed Jun. 3, 2009 in U.S. Appl. No. 11/393,335.

"Business Analysis with OLAP", Netways, http://www.netways.com/newsletter.olap.html, printed Mar. 7, 2006, 3 pp.

"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.

"Chapter 13—OLAP Services", SQL Server 7.0 Resource Guide, 2006 Microsoft Corporation, http://www.microsoft.com/technet/prodtechnol/sql/70/reskit/part9/sqc12.mspx, printed Mar. 6, 2006, 18 pp.

"Cognos 8 Business Intelligence Overview", Cognos Incorporated, http://www.cognos.com/products/cognos8businessintelligence/index.html, printed Jan. 11, 2006, 1 pp.

"CorVu Products", Seabrook, http://www.seabrook.ie/corvu.htm#corvurapidscorecard, printed Mar. 7, 2006, 3 pp.

"Enhanced Vendor Scorecards Vendor Documentation", Publix Super Markets, Inc., copyright 2003, revised date Feb. 9, 2004, http://my.datexx.com/www/customer/p14/Vendor%20EVS%20Documentation.pdf, 25 pp.

"Extend Business Scorecard Manager 2005", ProClarity, http://www.proclarity.com/products/clients_scorecardmanager.asp, printed Jan. 11, 2006, 2 pp.

"Microsoft Office Business Scorecard Manager 2005 Overview and Benefits", Microsoft Corporation, http://www.office.microsoft.com/en-us/assistance/HA012225141033.aspx, printed Jan. 11, 2006, 3 pp.

"MicroStrategy: Best in Business Intelligence", MicroStrategy Inc., http://www.microstrategy.com/Software/Products/User-Interfaces/Web, printed Jan. 11, 2006, 3 pp.

"OutlookSoft CPM: A Unified Corporate Performance Management Solution", OutlookSoft Corporation, http://www.outlooksoft.com/product.index.htm, printed Jan. 11, 2006, 2 pp.

"SBM Solutions: Product Guide", SBM Associates, http://www.productcosting.com/prodguide.htm, printed Feb. 28, 2006, 1 pp.

"Scorecard ing with Cognos® Metrics Manager", Cognos, http://www.cognos.com/pdfs/factsheets/fs_scorcarding_with_cognos_metrics_manager.pdf, printed Mar. 7, 2006, 4 pp.

"The Balanced Scorecard", http://cc.msncache.com/cache.aspx?q=2846702033267&lang=en-US&mkt=en-US&FORM=CVRE3, 4 pp.

Bird, Steven et al., "Annotation Graphs as a Framework for Multidimensional Linguistic Data Analysis", http:///acl.ldc.upenn.educ/W/W99/W99-0301.pdf, printed Jan. 12, 2006, pp. 1-10.

Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.

Elmanova, Natalia, "Implementing OLAP in Delphi Applications", http://www.only4gurus.net/miscellaneous/implementing_olap_in_delphi_a.doc, printed Mar. 6, 2006, 19 pp.

Ferguson, Mike, "Conquering CPM and Business Intelligence", Business Intelligence.com, ITNews265, http://www.businessintelligence.com/ex/asp.code.21/xe/article.htm, printed Jan. 11, 2006, 6 pp.

Lebow, David G. et al., "HyLighter: An Effective Interactive Annotation Innovation for Distance Education", http://wwwuwex.edu/disted/conference/Resource_library/proceedings/04_1344.pdf, printed Jan. 12, 2006, 5 pp.

Rother, Kristian et al., "Multidimensional Data Integration of Protein Annotations", Springer-Verlag GmbH, http://www.springerlink.com/(3riocx450rr2iv55x2txum55)/app/home/contribution.asp?referrer=parent&backto=issue,11,15;journal,827,2337;linkingpublicationresults,1:105633,1, printed Jan. 12, 2006, 2 pp.

Sanders, Paul, "SQL Server 2005: Real-Time Business Intelligence Using Analysis Services", Microsoft Corporation, Apr. 1, 2005, http://www.microsoft.com/technet/prodtechnol/sql/2005/rtbissas.mspx, printed Jan. 11, 2006, 9 pp.

U.S. Appl. No. 11/039,714, filed Jan. 1, 2005 entitled "System and Method for Multi-Dimensional Average-Weighted Banding Status and Scoring".

U.S. Appl. No. 11/214,678, filed Aug. 30, 2005 entitled "Visual Designer for Multi-Dimensional Business Logic".

U.S. Appl. No. 11/280,548, filed Nov. 16, 2005 entitled "Score-Based Alerting in Business Logic".

U.S. Appl. No. 11/313,324, filed Dec. 21, 2005 entitled "Application Independent Rendering of Scorecard Metrics".

U.S. Appl. No. 11/313,327, filed Dec. 21 2005 entitled "Repeated Inheritance of Heterogeneous Business Metrics".

U.S. Appl. No. 11/313,390, filed Dec. 21, 2005 entitled "Disconnected Authoring of Business Definitions".

U.S. Appl. No. 11/313,899, filed Dec. 21, 2005 entitled "Centralized Model for Coordinating Update of Multiple Reports".

U.S. Appl. No. 11/393,115, filed Mar. 30, 2006 entitled "Definition and Instantiation of Metric Based Business Logic Reports".

U.S. Appl. No. 11/393,335, filed Mar. 30, 2006 entitled "MultiDimensional Metrics-Based Annotation".
U.S. Appl. No. 11/408,450, filed Apr. 21, 2006 entitled "Grouping and Display of Logically Defined Reports".
U.S. Appl. No. 11/412,434, filed Apr. 27, 2006 entitled "Multidimensional Scorecard Header Definition".
U.S. Appl. No. 11/412,458, filed Apr. 27, 2006 entitled "Concerted Coordination of Multi-Dimensional Scorecards".
U.S. Appl. No. 11/412,499, filed Apr. 27, 2006 entitled "Automated Determination of Relevant Slice in Multidimensional Data Sources".
Zaidi, Omar et al., "Data Center Consolidation: Using Performance Metrics to Achieve Success", http://searchnetworking.techtarget.com/searchNetworking/Downloads/IV_INS_DataCenter_Consolidation_WP.pdf, printed Jan. 12, 2006, 10 pp.
U.S. Official Action mailed May 28, 2009 in U.S. Appl. No. 11/214,678.
U.S. Official Action mailed Jun. 19, 2009 in U.S. Appl. No. 11/408,450.
U.S. Official Action mailed Aug. 6, 2009 in U.S. Appl. No. 11/668,520.
U.S. Official Action mailed Aug. 19, 2009 in U.S. Appl. No. 11/393,115.
U.S. Official Action mailed Sep. 1, 2009 in U.S. Appl. No. 11/412,434.
U.S. Official Action mailed Sep. 2, 2009 in U.S. Appl. No. 11/624,171.
U.S. Official Action mailed Sep. 30, 2009 in U.S. Appl. No. 11/214,678.
Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf.
"Data Driven Components," Java Developers Journal, SYS-CON Media, Inc. 2004, http://www2.sys-con.com/itsg/virtualed/Java/archives/0405/hyrkas/index.html, 7 pp.
"Hyperion Intelligence Desktop, Plugin, and HTML Client Products," Hyperion™ Developer Network, http://dev.hyperion.com/resource_library/articles/intelligence_desktop_article.cfm, 7 pp.
"BusinessObjects Enterprise 6," An End-to-End Overview, White Paper., http://www.spain.businessobjects.com/global/pdf/products/queryanalysis/wp_e6_overview.pdf, 20 pp.
"Cognos 8 Business Intelligence—Dashboards," COGNOS® The Next Level of Performance, http://www.cognos.com/products/cognos8businessintelligence/dashboards.html, 2 pp.
"Microsoft Builds Business Intelligence Into Office Software," Microsoft PressPass—Information for Journalists, http://www.microsoft.com/presspass/press/2005/oct05/10-23BiLalunchPR.mspx, 4 pp.
"Hyperion System 9 BI+Enterprise Metrics," A Hyperion Data Sheet, Hyperion Solutions Corporation Worldwide Headquarters, Oct. 2006, http://www.hyperion.com/products/resource_library/product_collateral/EnterpriseMetrics.pdf, pp. 1-2.
"Products: PilotWorks," Products: PilotWorks—Scorecard, 2006 Pilot Software, pp. 1-3.
"Reveleus Business Analytics," Reveleus, an i-flex businedss, pp. 1-4.
Batista, Gustavo E.A.P.A.; Monard, Maria Carolina; "An Analysis of Four Missing Data Treatment Methods for Supervised Learning," University of Sao Paulo, Institute of Mathematics and Computer Science (ICMC), http://coblitz.codeen.org:3125/citeseer.ist.psu.edu/cache/papers/cs/27545/http:zSzzSzwww.icmc.usp.brzSz~gbatistazSzpdfszSzaai2003.pdf/batista03analysis.pdf, 12 pp.
"Crystal Xcelsius Workgroup." http://www.xcelsius.com/Products/Enterprise_feastures.html, 3 pp.
"Reporting and Dashboards with Cognos 8 Business Intelligence," Cognos, The Next Level of Intelligence, http://www.cognos.com/pdfs/whitepapers/wp_reporting_and_dashboards_with_c8bi.pdf, pp. 1-16.
"BusinessObjects Plan Dashboarding XI for Retail," BusinessObjects, http://www.businessobjects.com/pdf/products/planning/plan_dashboarding_rt.pdf, 2 pp.
"SAS® Risk Intelligence Offerings, Risk Reporting; Data Integration; Internal Risk Ratings; Credit Risk; Market Risk; Operational Risk", http://www.sas.com/industry/fsi/risk/brochure2.pdf, 12 pp.
Tenhunen, Jarkko; Ukko, Juhani; Markus, Tapio; Rantanen, Hannu; "Applying Balanced Scorecard Principles on the SAKE-System: Case Telekolmio Oy," Lappeenranta University of Technology (Department of Industrial Engineering and Management); Telekolmio Oy (Finland). http://www.lut.fi/tuta/lahti/sake/IWPM2003a.pdf, 11 pp.
Kleijnen, Jack; Smits, Martin T.; "Performance Metrics in Supply Chain Management," Tilburg University, The Netherlands, Department of Information Systems and Management. http://center.kub.nl/staff/kleijnen/jors-proofs.pdf, 8 pp.
Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.an/BUSN7040/Articles/Martinsons%20et%20al%201999%20DSS%20the%20balanced%20scorecard.pdf, 18 pp.
U.S. Office Action mailed Jul. 25, 2008 cited in U.S. Appl. No. 11/412,434.
U.S. Office Action mailed Sep. 5, 2008 cited in U.S. Appl. No. 11/280,548.
U.S. Office Action dated Nov. 24, 2008 cited in U.S. Appl. No. 11/214,678.
John Wiley et al., "Power Point All-in-One Desk Reference for Dummies," Jan. 10, 2007.
U.S. Official Action mailed Oct. 21, 2009 in U.S. Appl. No. 11/280,548.
U.S. Official Action mailed Dec. 8, 2009 in U.S. Appl. No. 11/393,335.
U.S. Official Action mailed Dec. 28, 2009 in U.S. Appl. No. 11/624,171.
U.S. Official Action mailed Jan. 15, 2010 in U.S. Appl. No. 11/408,450.
IndicatorBarometer; retrieved from <http://www.aiqsystems.com/docs/ref_7.pdf>, archived Oct. 15, 2004.
U.S. Official Action mailed Jan. 22, 2010 in U.S. Appl. No. 11/039,714.
U.S. Official Action mailed Feb. 3, 2010 in U.S. Appl. No. 11/668,530.

* cited by examiner

AUTOMATED GENERATION OF DASHBOARDS FOR SCORECARD METRICS AND SUBORDINATE REPORTING

BACKGROUND

Key Performance Indicators, also known as KPI or Key Success Indicators (KSI), help an organization define and measure progress toward organizational goals. Once an organization has analyzed its mission, identified all its stakeholders, and defined its goals, it needs a way to measure progress toward those goals. Key Performance Indicators are used to provide those measurements.

Scorecards are used to provide detailed and summary analysis of KPI's and aggregated KPI's such as KPI groups, objectives, and the like. Scorecard calculations are typically specific to a defined hierarchy of the above mentioned elements, selected targets, and status indicator schemes. Business logic applications that generate, author, and analyze scorecards are typically enterprise applications with multiple users (subscribers), designers, and administrators. It is not uncommon, for organizations to provide their raw performance data to a third party and receive scorecard representations, analysis results, and similar reports.

Scorecards and dashboards provide "at-a-glance" information about business performance across the enterprise. While scorecards provide a visual representation of standard KPIs, dashboards provide an illustrative representation of business performance across an entire organization. Dashboards highlight critical areas of interest against which further detailed information may be requested.

Some business applications are limited in coordinating scorecard services. Typically, manual configuration is required to create an interactive dashboard where a user can drill down across metrics in a scorecard. Other applications create a dashboard by first creating a website, then creating a storage container (also referred to as "list"), creating a special form of the web page for that list, and adding the appropriate web parts to configure them in the desired format with the desired associations.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Aspects are directed to automatically generating a dashboard template based on a scorecard selection and enabling a subscriber to customize the dashboard. Definitions associated with the template are stored in metadata. The dashboard may be deployed to one or more locations to be consumed and further customized by end users independent of a web presentation platform.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a dashboard providing a scorecard view along with selected subordinate reports may be defined based on subscriber selections and deployed to one or more servers using centrally managed metadata. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
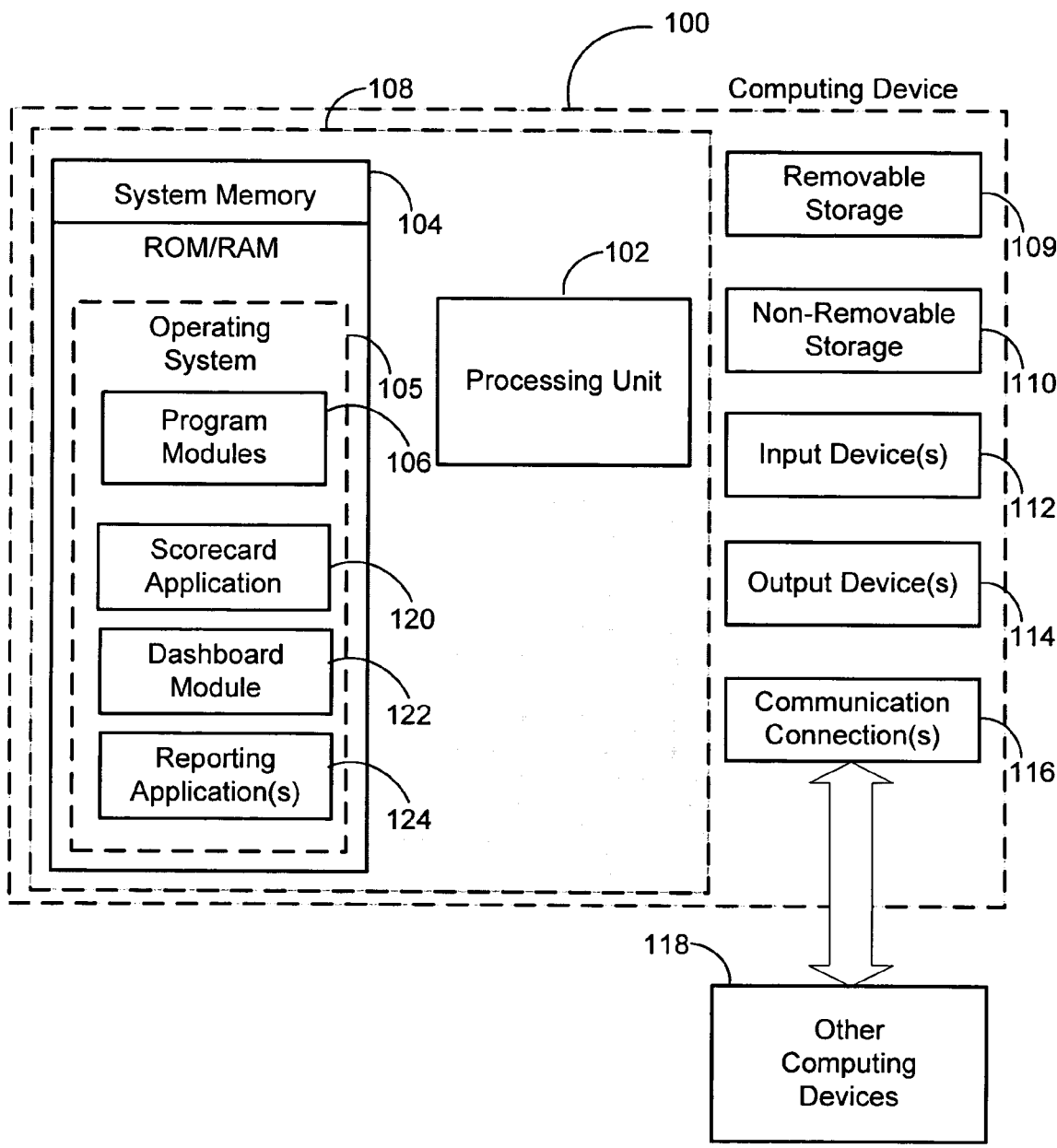
FIG. 1 is a block diagram of an exemplary computing operating environment.

Referring now to the drawings, aspects and an exemplary computing operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, scorecard application 120, dashboard module 122, and reporting application(s) 124. Scorecard application 120 manages business evaluation methods, computes KPI's, and provides scorecard data to reporting application(s) 124. In some embodiments, scorecard application 120 may itself generate reports based on metric data.

Dashboard module 122 manages coordination and presentation of subordinate reports with scorecard application 120. Dashboard module 122 may be an integrated part of scorecard application 120 or a separate application. Scorecard application 120, dashboard module 122, and reporting application(s) 124 may communicate between themselves and with other applications running on computing device 100 or on other devices. Furthermore, any one of scorecard application 120, dashboard module 122, and reporting application(s) 124 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
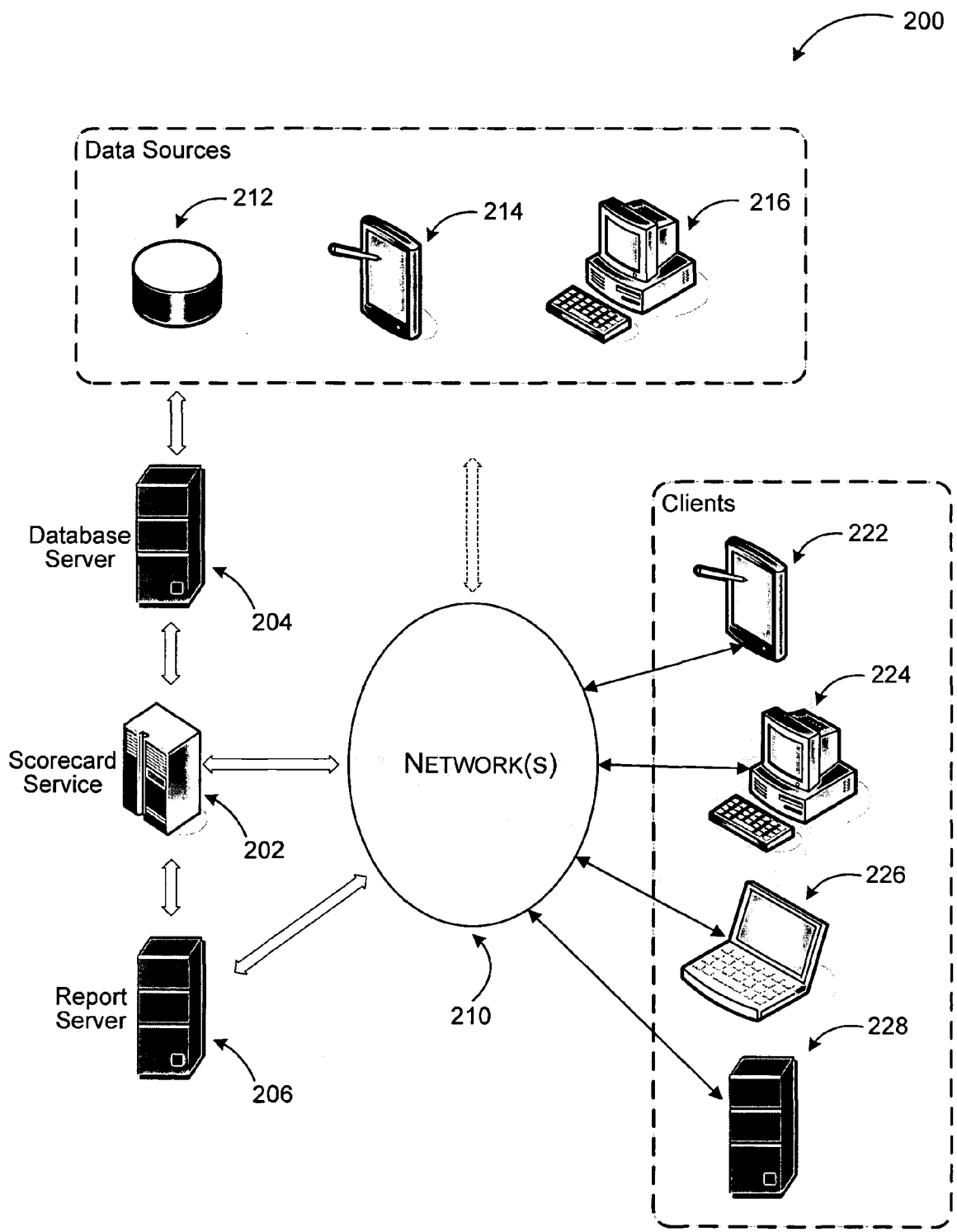
FIG. 2 illustrates a system where example embodiments may be implemented.

Referring to FIG. 2, a system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform business logic operations. Scorecard service 202, database server 204, and report server 206 may also be one or more programs or a server machine executing programs associated with the server tasks. Both clients and application servers may be embodied as single device (or program) or a number of devices (programs). Similarly, data sources may include one or more data stores, input devices, and the like.

A business logic application may be run centrally on scorecard service 202 or in a distributed manner over several servers and/or client devices. Scorecard service 202 may include implementation of a number of information systems such as performance measures, business scorecards, and exception reporting. A number of organization-specific applications including, but not limited to, financial reporting, analysis, marketing analysis, customer service, and manufacturing planning applications may also be configured, deployed, and shared in system 200. In addition, the business logic application may also be run in one or more client devices and information exchanged over network(s) 210.

Data sources 212, 214, and 216 are examples of a number of data sources that may provide input to scorecard service 202 through database server 204. Additional data sources may include SQL servers, databases, non multi-dimensional data sources such as text files or EXCELS sheets, multi-dimensional data source such as data cubes, and the like. Database server 204 may manage the data sources, optimize queries, and the like.

Users may interact with scorecard service 202 running the business logic application from client devices 222, 224, and 226 over network(s) 210. In one embodiment, additional applications that consume scorecard-based data may reside on scorecard service 202 or client devices 222, 224, and 226. Examples of such applications and their relation to the scorecard application are provided below in conjunction with FIG. 3.

Report server 206 may include reporting applications, such as charting applications, alerting applications, analysis applications, and the like. These applications may receive scorecard data from scorecard service 202 and provide reports directly or through scorecard service 202 to clients.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement a business logic application automatically generating dashboards with scorecard metrics and subordinate reporting.

Figure 3:
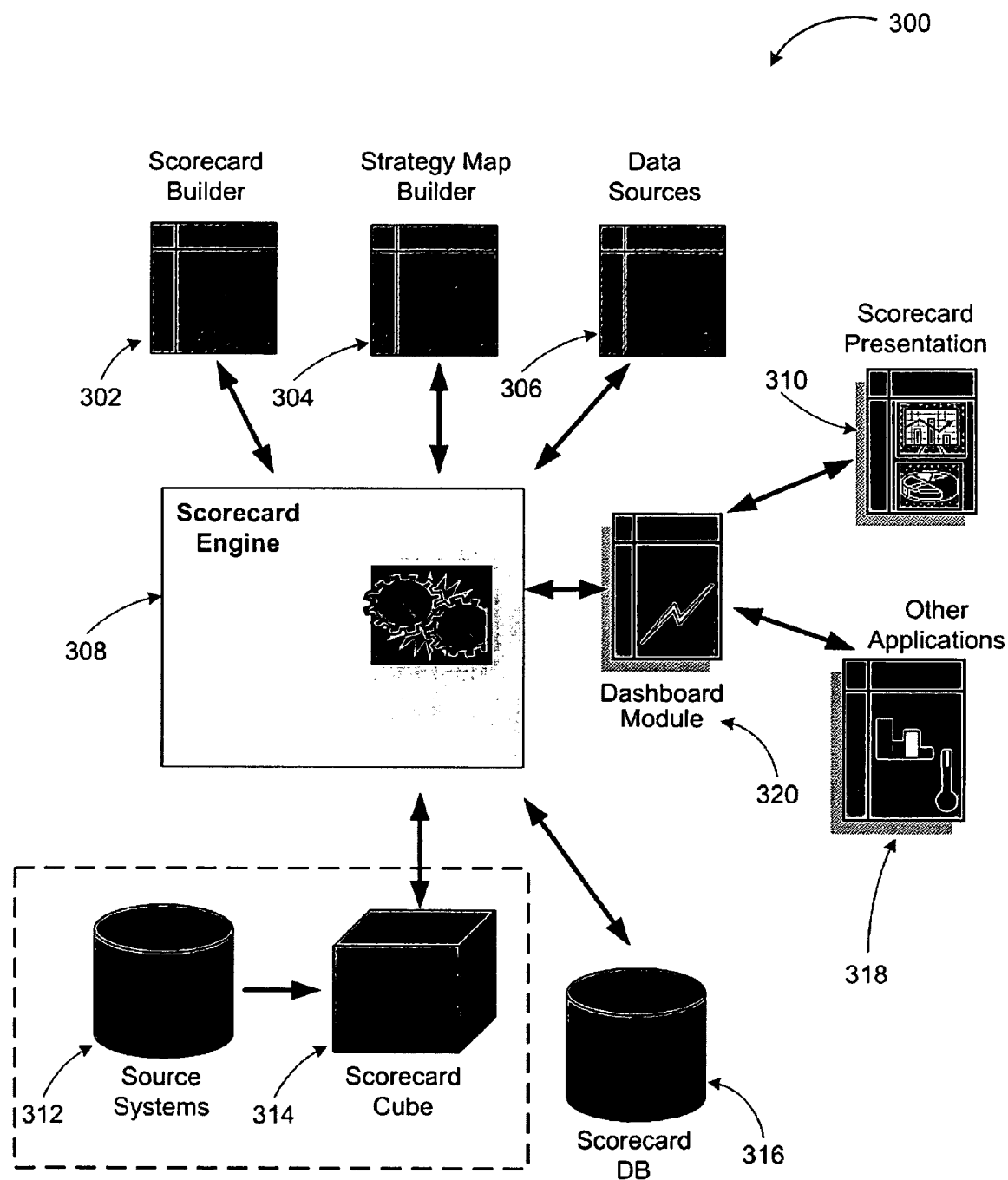
FIG. 3 illustrates an example scorecard architecture according to embodiments.

Now referring to FIG. 3, example scorecard architecture 300 is illustrated. Scorecard architecture 300 may comprise any topology of processing systems, storage systems, source systems, and configuration systems. Scorecard architecture 300 may also have a static or dynamic topology.

Scorecards are a simple method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture 300, a core of the system is scorecard engine 308. Scorecard engine 308 may be an application that is arranged to evaluate performance metrics. Scorecard engine 308 may be loaded into a server, executed over a distributed network, executed in a client device, and the like.

In addition to performing scorecard calculation, scorecard engine may also provide report parameters associated with a scorecard to other applications 318. The report parameters may be determined based on a subscriber request or a user interface configuration. The user interface configuration may include a subscriber credential or a subscriber permission attribute. The report parameter may include a scorecard identifier, a scorecard view identifier, a row identifier, a column identifier, a page filter, a performance measure group identifier, or a performance measure identifier. The performance measure may be a KPI, a KPI group, or an objective. The page filter determines a period and an organizational unit for application of the scorecard calculations.

Data for evaluating various measures may be provided by a data source. The data source may include source systems 312, which provide data to a scorecard cube 314 or to the scorecard service directly. Source systems 312 may include multi-dimensional databases such as an Online Analytical Processing (OLAP) database, other databases, individual files, and the like, that provide raw data for generation of scorecards. Scorecard cube 314 is a multi-dimensional database for storing data to be used in determining Key Performance Indicators (KPIs) as well as generated scorecards themselves. As discussed above, the multi-dimensional nature of scorecard cube 314 enables storage, use, and presentation of data over multiple dimensions such as compound performance indicators for different geographic areas, organizational groups, or even for different time intervals. Scorecard cube 314 has a bi-directional interaction with scorecard engine 308 providing and receiving raw data as well as generated scorecards.

Scorecard database 316 is arranged to operate in a similar manner to scorecard cube 314. In one embodiment, scorecard database 316 may be an external database providing a caching service that may also be used as a redundant back-up database service.

Scorecard builder 302 may be a separate application, a part of the performance evaluation application, and the like.

Scorecard builder 302 is employed to configure various parameters of scorecard engine 308 such as scorecard elements, default values for actuals, targets, and the like. Scorecard builder 302 may include a user interface such as a web service, a Graphical User Interface (GUI), and the like.

Strategy map builder 304 is employed for a later stage in scorecard generation process. As explained below, scores for KPIs and parent nodes such as Objective and Perspective may be presented to a user in form of a strategy map. Strategy map builder 304 may include a user interface for selecting graphical formats, indicator elements, and other graphical parameters of the presentation.

Data Sources 306 may be another source for providing raw data to scorecard engine 308. Data sources may be comprised of a mix of several multi-dimensional and relational databases or other Open Database Connectivity (ODBC)-accessible data source systems (e.g. Excel, text files, etc.). Data sources 306 may also define KPI mappings and other associated data.

Scorecard architecture 300 may include scorecard presentation 310. This may be an application to deploy scorecards, customize views, coordinate distribution of scorecard data, and process web-specific applications associated with the performance evaluation process. For example, scorecard presentation 310 may include a web-based printing system, an email distribution system, and the like. A user interface for scorecard presentation 310 may also include an overview of available scorecards for a subscriber to select from. Scorecard presentation 310 may further include a matrix or a list presentation of the scorecard data. The scorecard presentation and one or more zones for other applications may be displayed in an integrated manner.

Dashboard module 320 is configured to interact with scorecard engine 308, scorecard presentation 310, other applications 318, and manage automated generation of dashboards with scorecard metrics and subordinate reporting.

Other applications 318 may include any application that receives data associated with a report parameter and consumes the data to provide a report, perform analysis, provide alerts, perform further calculations, and the like. The data associated with the report parameter includes content data and metadata. Other applications may be selected based on the report parameter, a subscriber request, or a user interface configuration. The user interface configuration may include a subscriber credential or a subscriber permission attribute. Other applications 318 may include a graphical representation application, a database application, a data analysis application, a communications application, an alerting application, or a word processing application.

Figure 4:
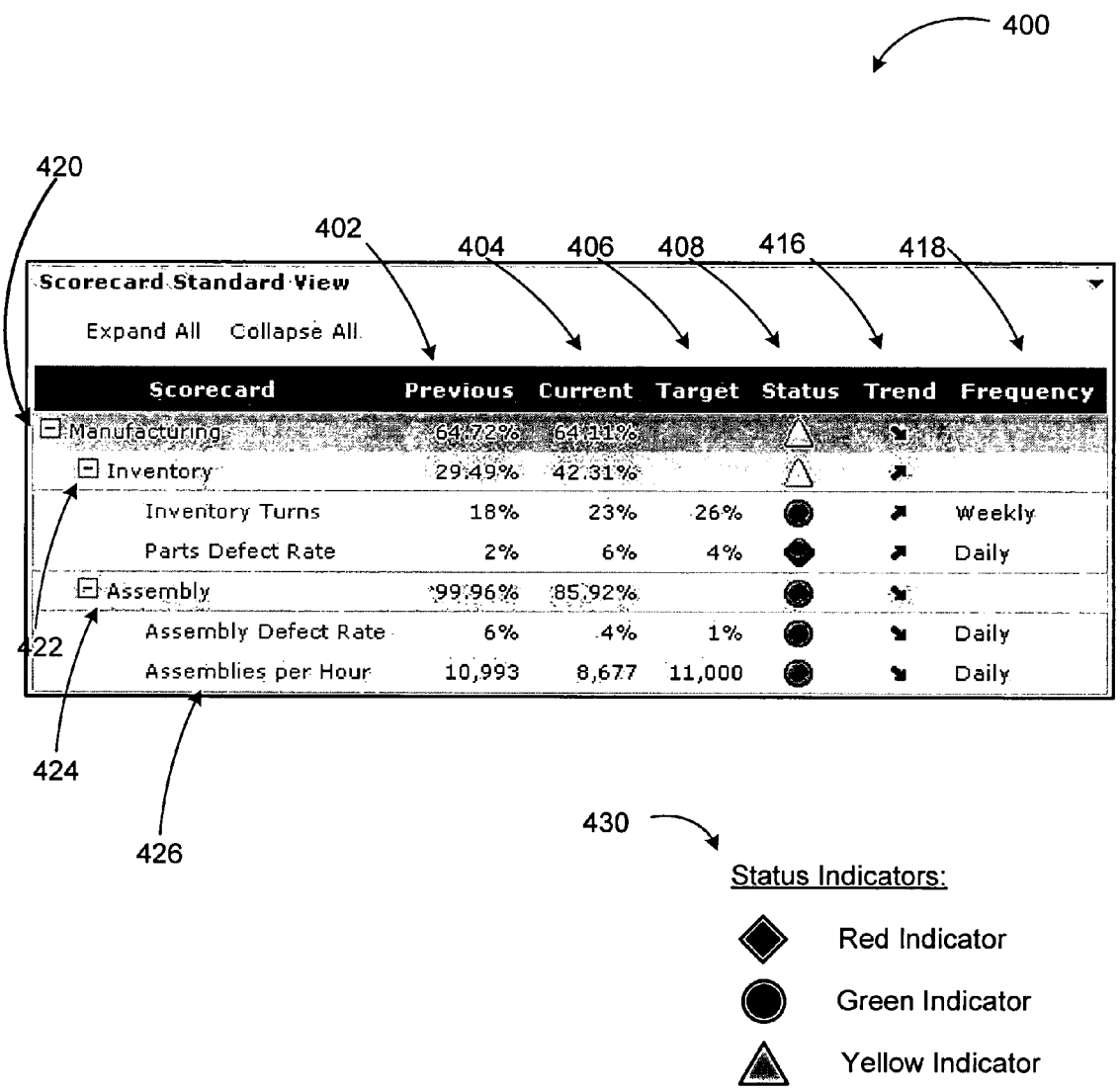
FIG. 4 illustrates a screenshot of an example scorecard.

FIG. 4 illustrates a screenshot of an example scorecard. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. The shared use of KPI definition may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes. The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and in setting and interpreting the KPI banding boundary values. The trend arrows displayed in scorecard 400 indicate how the numbers are moving this period compared to last. If in this period the number is greater than last period, the trend is up regardless of the trend type. Possible trend types may include: Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their parent Objective.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one might be off target. By utilizing the hierarchical scorecard definition along with KPI weightings, a status value is calculated at each level of the scorecard.

First column of scorecard 400 shows example elements perspective 420 "Manufacturing" with objectives 422 and 424 "Inventory" and "Assembly" (respectively) reporting to it. Second column 402 in scorecard 400 shows results for each measure from a previous measurement period. Third column 404 shows results for the same measures for the current measurement period. In one embodiment, the measurement period may include a month, a quarter, a tax year, a calendar year, and the like.

Fourth column 406 includes target values for specified KPIs on scorecard 400. Target values may be retrieved from a database, entered by a user, and the like. Column 408 of scorecard 400 shows status indicators.

Status indicators 430 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Indicators with more than three levels may appear as a bar divided into sections, or bands. Column 416 includes trend type arrows as explained above under KPI attributes. Column 418 shows another KPI attribute, frequency.

Figure 5:
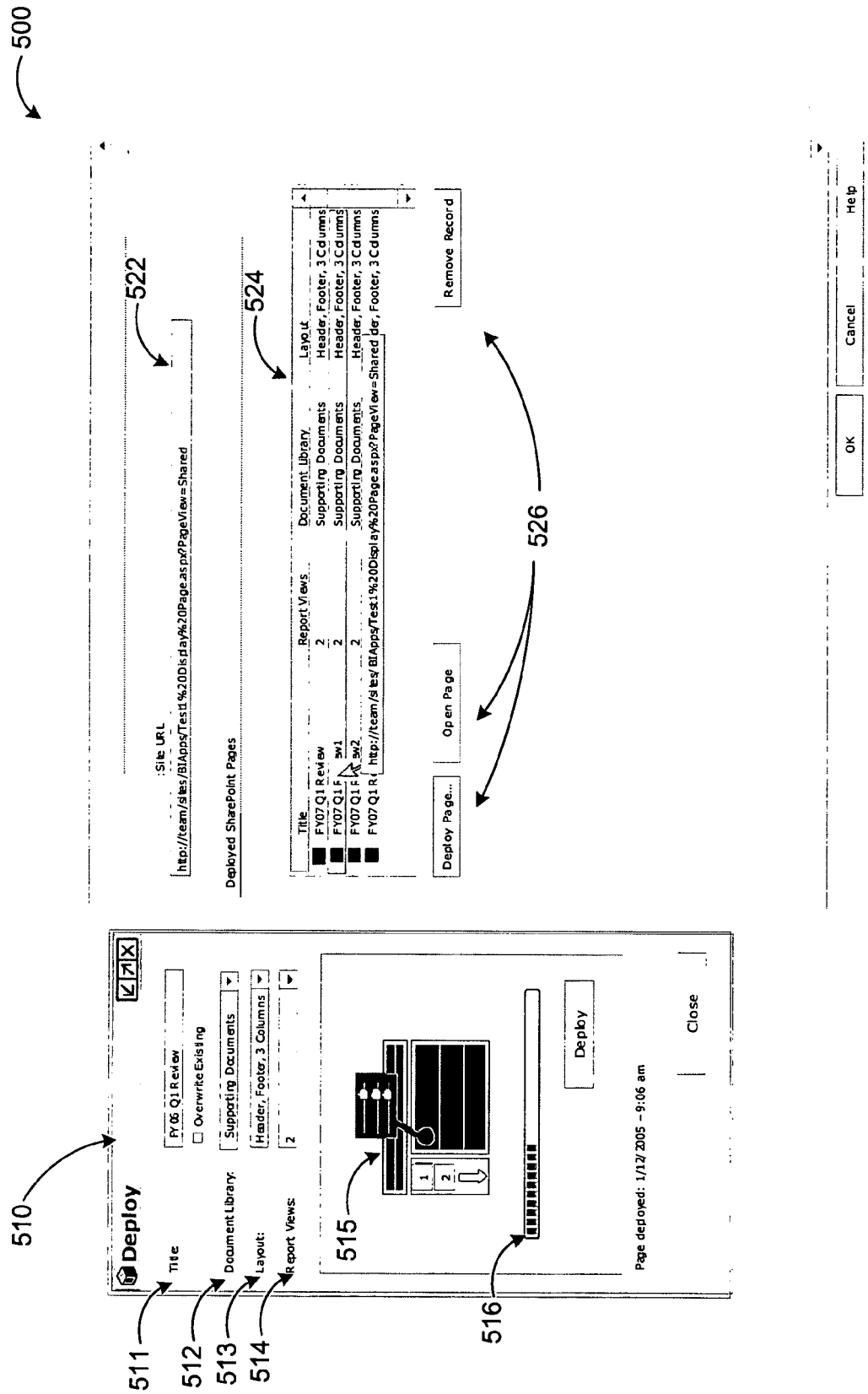
FIG. 5 illustrates an example deployment UI for generating dashboards with scorecard metrics and subordinate reporting.

FIG. 5 illustrates an example deployment UI for generating dashboards with scorecard metrics and subordinate reporting. Deployment UI 500 shows an example of many ways of interfacing with a subscriber to generate and deploy a dashboard based on scorecard information. First portion of the UI designated by reference numeral 510 provides options for the dashboard in dropdown menu style. The options are title 511 (e.g. "FY 06 Q1 Review"), document library 512 for defining a source for support documentation, layout 513 for the layout of the scorecard presentation, and reports views 514 to indicate a number of the subordinate reports to be presented along with the scorecard. A preview 515 may also be included to provide feedback to the subscriber. A deploy button allows the subscriber to deploy the dashboard once all options have been selected. Progress monitor 516 shows a status of deployment progress.

A second portion of the deployment UI designated by reference numeral 520 includes a network address (Site URL 522) for the deployment location. A list of already deployed pages 524 is also provided. Control buttons 526 enable the subscriber to deploy a selected page, open for editing, or remove from the list of available pages.

Embodiments are not limited to the example UI layouts and methods described above. Dashboard options may be provided and input received from subscribers in many other ways including, but not limited to, drag and drop style controls, directory-tree style listing of options, graphic (icons) presentation of options, and the like.

Figure 6:
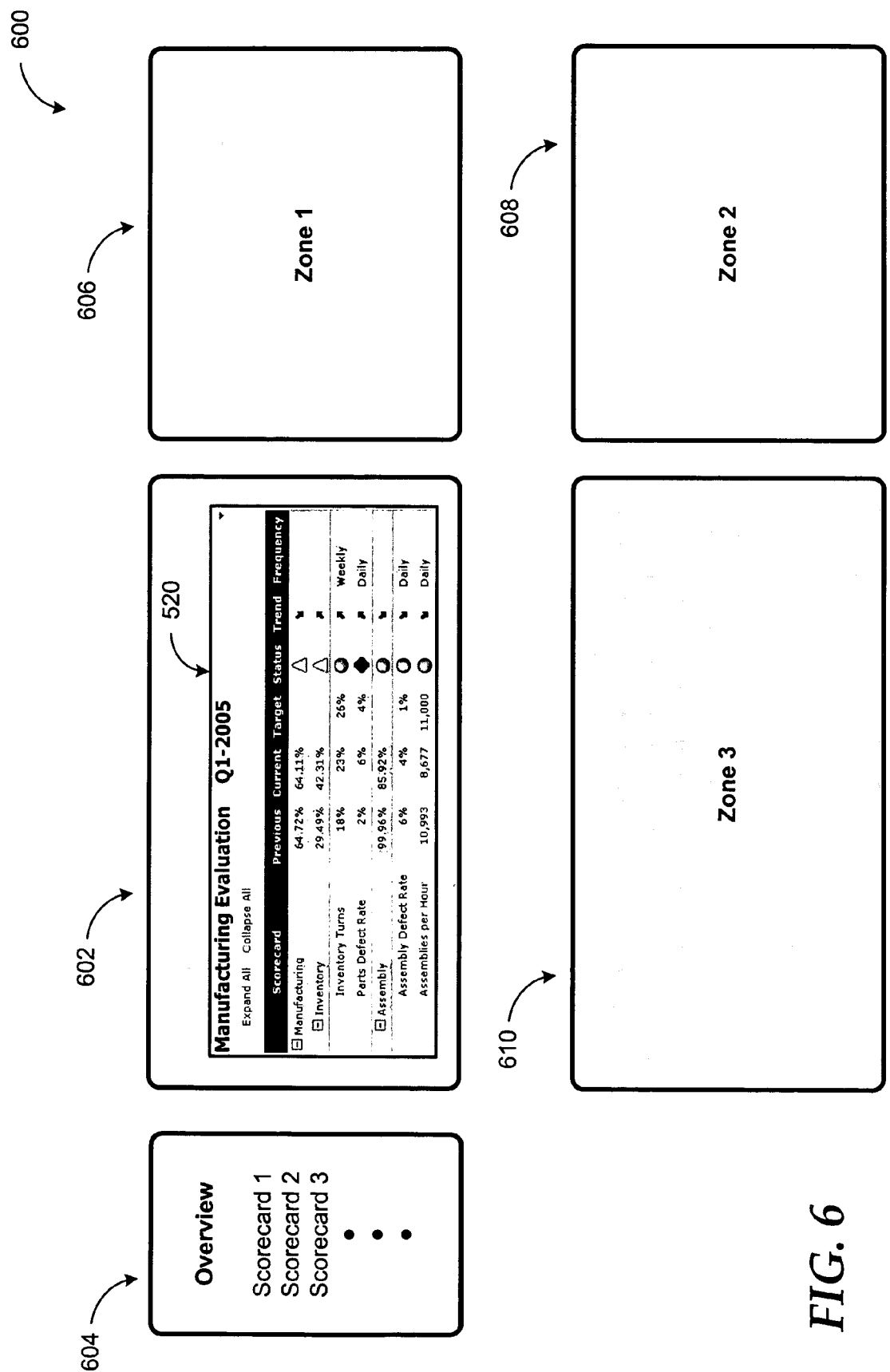
FIG. 6 illustrates a conceptual diagram of a scorecard presentation with zones for applications that provide subordinate reporting based on scorecard information.

FIG. 6 illustrates conceptual diagram 600 of a scorecard presentation with zones for applications that consume scorecard information. Diagram 600 includes scorecard view 602 with scorecard 620, overview 604 and zones 1 through 3 (606, 608, 610).

Scorecard view 602 is the scorecard presentation screen of a scorecard application. It presents example scorecard 620 for "Manufacturing Evaluation" for first quarter of 2005 (Q1-2005). Elements of scorecard 620 such as KPI's, objectives, columns, indicators, and the like have been described previously. Overview 604 is another user interface (UI) of the scorecard application that presents a subscriber available scorecards for selection. In some embodiments, scorecard 620 may be selected dynamically based on subscriber credentials, UI configuration, and the like.

According to some embodiments, the scorecard application may include one or more zones for displaying user interfaces of other applications associated with the scorecard application. Such applications may include a graphical representation application, a database application, a data analysis application, a communications application, an alerting application, and a word processing application. These applications may receive data associated with the scorecard and present various UI's to the user such as an interactive chart, an alert UI, a communication forum for subscribers, and the like. A layout of the zones may be determined by a default configuration of the scorecard application, user selection, and the like.

According to one embodiment, page filters, row slices, column slices, and the like may be sent from a scorecard view through a query string to another application. This enables a subscriber to create a custom view that displays selected data in an active cell in a scorecard view. The information may be passed to the other application in form of a query string.

In another embodiment, a query string is generated when the subscriber selects data in a scorecard that has page filters.

The items in the query string may be in form of well-formed XML fragments. Each XML fragment may contain a root node for page filters, row slices, and column slices. The root node might or might not contain child nodes, depending on what page filters, row slices, or column slices are passed. Other information that is passed in the query string may include the scorecard ID, the objective ID, and the KPI measure ID.

Data associated with the scorecard (e.g. query strings in form of XML fragments) may be provided to the other applications in zones 606, 608, and 610. According to another embodiment, data associated with the scorecard may be provided by a target application to the scorecard application for updating the scorecard. Blocks and illustrations of diagram 600 are exemplary, and do not constitute a limitation on embodiments. Other embodiments may be implemented using different number of zones, different layouts, and scorecard views.

Figure 7:
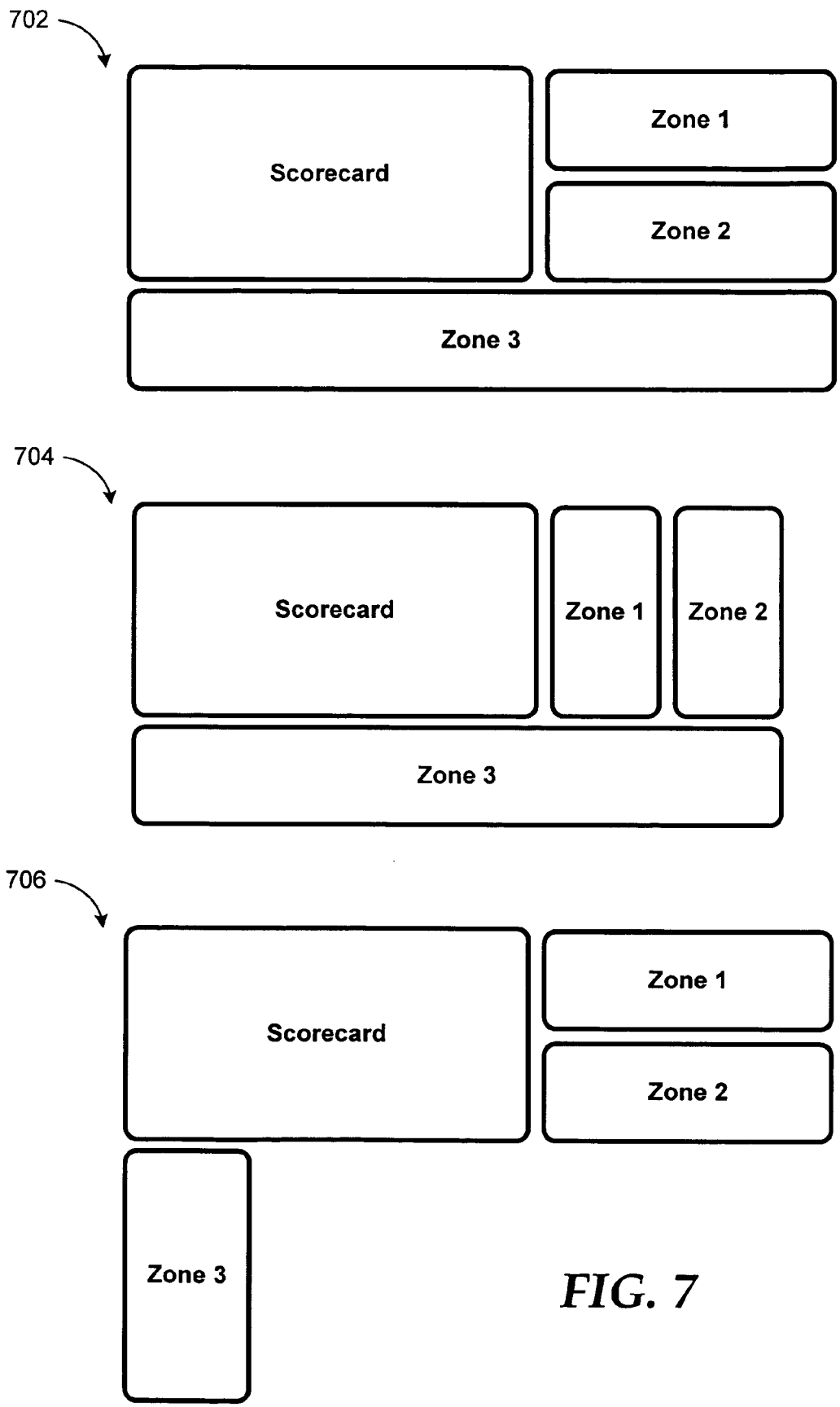
FIG. 7 illustrates different examples of subordinate report placement in a scorecard presentation.

FIG. 7 illustrates different examples of subordinate report placement in a scorecard presentation. Dashboard layout may include a scorecard presentation accompanied by a number of selected subordinate reports. As described previously, the subordinate reports may include charts, diagrams, analyses, as well as discussion threads, document libraries, and the like. Placement of subordinate reports in the dashboard layout in relation to the scorecard presentation may be based on size and number of subordinate reports, as well as their type(s).

For example, dimensions of reports may be selected based on their information content. A chart may be presented in a more proportional window, while a spreadsheet analysis may be presented in a more elongated window (zone). Example layout 702 shows a scorecard presentation with zones 1 and 2 to its right for two separate subordinate reports, and zone 3 at the bottom for yet another report. A width of zone 3 is selected to match the total width of the scorecard presentation and zones 1 and 2 adjacent to it.

Example layout 704 shows a similar placement of the three zones with zones 1 and 2 placed laterally this time, instead of one over the other. Zone 3 is still dimensioned to match the total width of the zones and scorecard presentation above it. Example layout 706 shows the scorecard presentation and zones 1, 2 similarly positioned to example layout 702, while zone 3 is not sized to match the total width this time. The change in the dimension may be intended to accommodate a type of subordinate report to be placed in zone 3.

Figure 8:
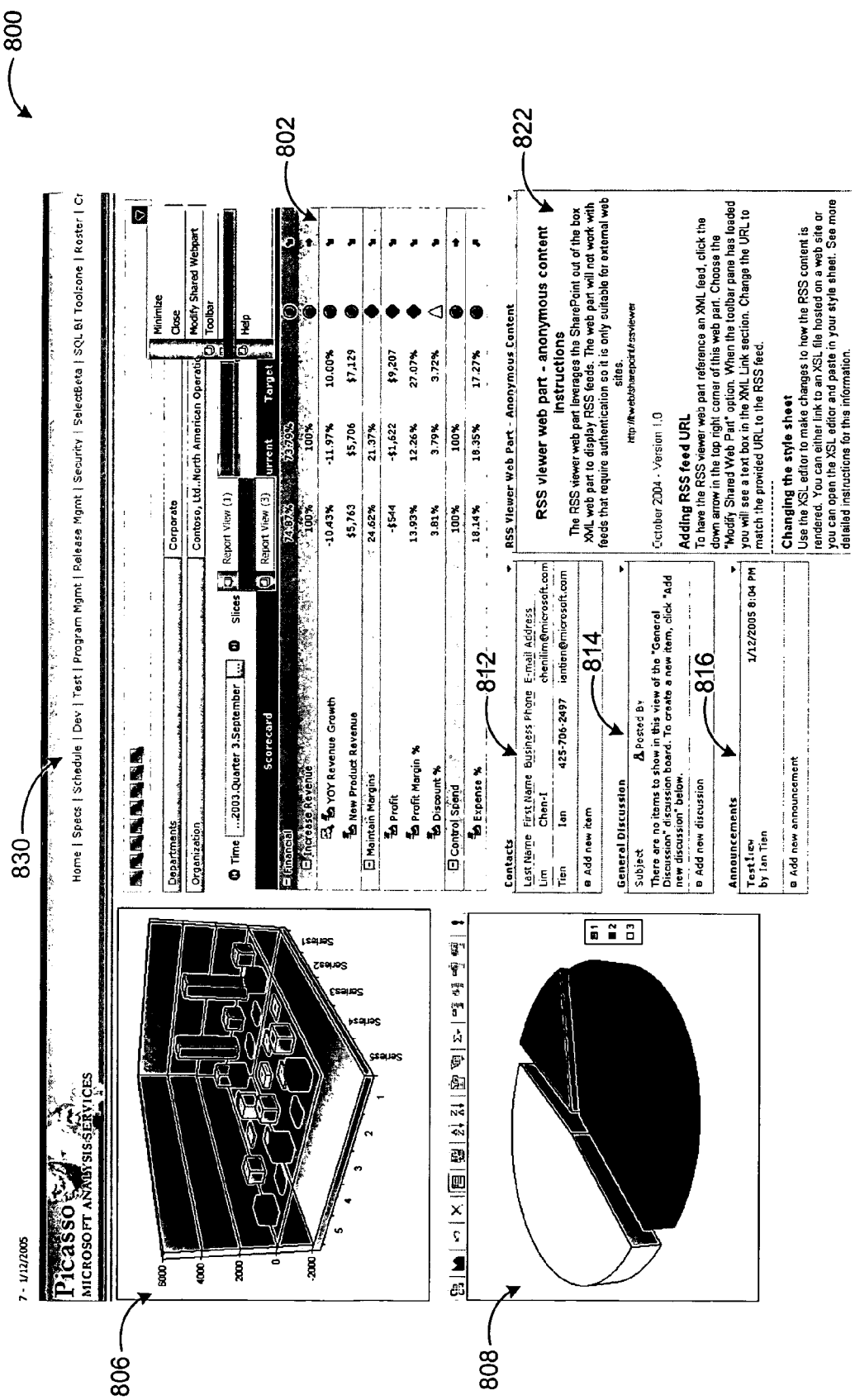
FIG. 8 illustrates a screenshot of an example scorecard presentation with multiple associated zones.

FIG. 8 illustrates a screenshot of an example scorecard presentation with multiple associated zones. Scorecard 802 is shown with two subordinate charts (806 and 808) in an application editor (830).

Scorecard 802 summarizes metrics for a particular division and financial period of an organization. Page filters, such as departments, organizational units, and period, are provided above the scorecard presentation in dropdown menu style. Scorecard 802 includes different levels of KPI's and objectives along with associated actuals, targets, and status indicators. By selecting among the available time periods and organizational units, a subscriber changes source data for the scorecard.

Subordinate reports 806 and 808 show two different charts based on scorecard 802. The data for the presented charts may be passed by the scorecard application to the charting application such as Microsoft EXCEL®. Other applications such as those listed before may also be presented in subordinate reports 806 and 808. Furthermore, a layout of the subordinate reports may be set depending on the report type, scorecard presentation dimensions, and the like.

While the subordinate reports are shown with limited UI elements, other applications may include UI elements that enable a subscriber to submit modifications to the report parameters (scorecard elements that are passed to the applications). In that case, the submitted modifications may be received by the scorecard application and scorecard 802 updated based on the modifications. Other scorecard presentations, target applications, status indicators, and the like may be implemented using the principles described herein.

Dashboard 800 includes additional elements such as RSS Viewer application 822, which may be used to display RSS feeds associated with the scorecard application and the presented scorecard. Further elements for dashboard 800 include Contacts 812, which lists names and contact information for subscribers associated with the presented scorecard; General Discussion forum 814, which may be used to facilitate a discussion among subscribers; and Announcements 816, which may be used to provide information such as alerts to subscribers related to the presented scorecard.

For example, alerts with different conditions may be assigned to the scores specific to individual levels or aggregate levels (e.g. objectives). Alerts may be based on absolute value comparisons (e.g. actual to target, actual to a threshold, and the like), status indicators (e.g. traffic light scheme, banding, trend scheme), range comparisons (e.g. actual or actual to target ratio within a range, outside a range, and the like), or on/off target determinations.

The example implementation of a dashboards, scorecards, and subordinate reports in FIGS. 3 through 8 is intended for illustration purposes only and should not be construed as a limitation on embodiments. Other embodiments may be implemented using the principles described herein.

Figure 9:
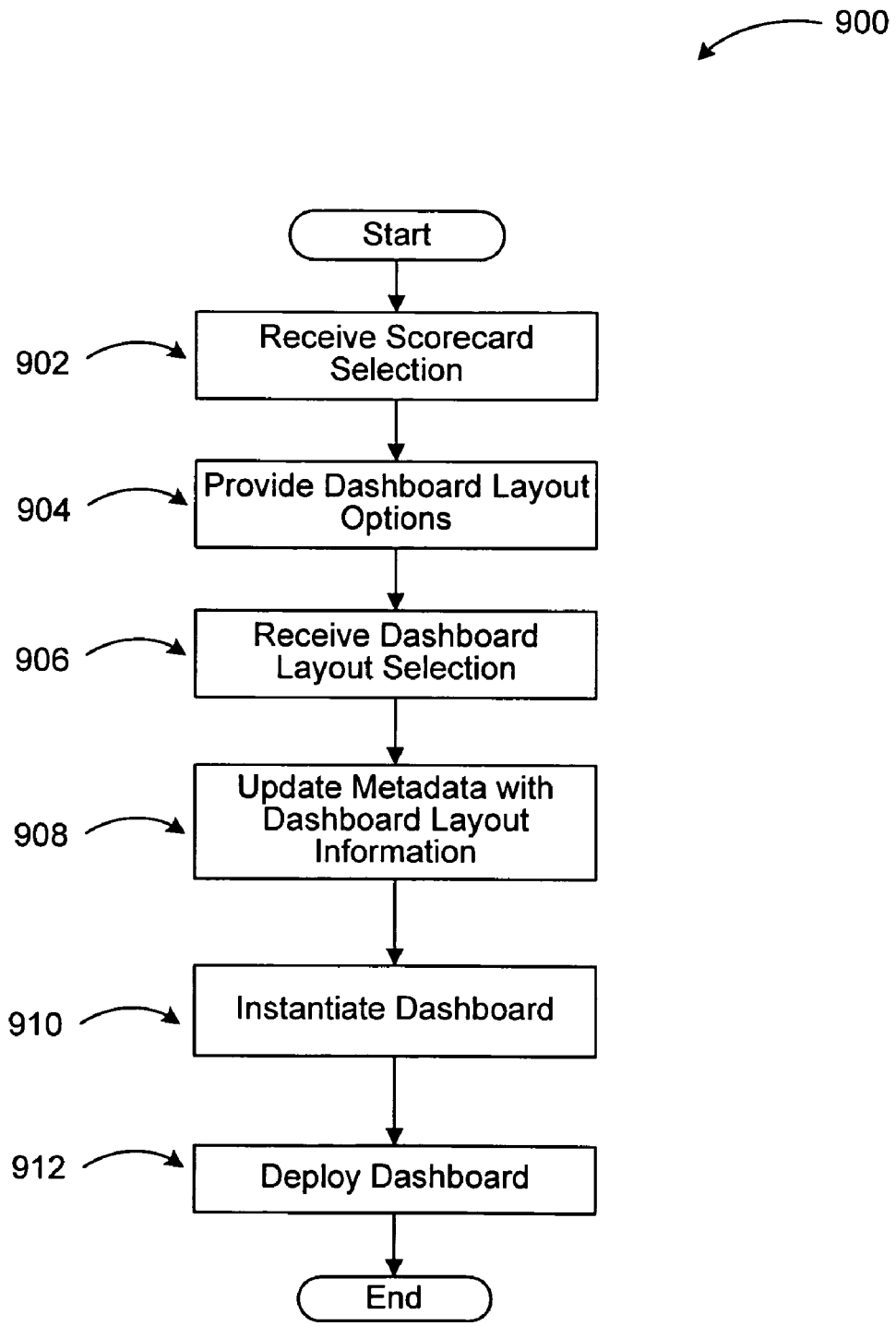
FIG. 9 illustrates a logic flow diagram of a process for automated generation of dashboards with scorecard metrics and subordinate reporting in a business logic system.

FIG. 9 illustrates a logic flow diagram of a process for automated generation of dashboards with scorecard metrics and subordinate reporting in a business logic system. Process 900 may be implemented in a business logic application.

Process 900 begins with operation 902, where a scorecard selection is received. The scorecard selection may be received from a subscriber selection among a number of available scorecards, from subscriber credentials, from past preferences, and the like. The scorecard selection is typically associated with a number of subordinate reports. According to some embodiments, an association between KPIs, scorecards, and subordinate reports is provided, in that each KPI has a subordinate report, and as KPIs are assembled into a scorecard to evaluate a particular ensemble of metrics, the pre-defined subordinate reports and associated analytics are brought along. Moreover, the behavior of the subordinate reports may also be predefined and designed to work within the dashboard layout selected. Processing moves from operation 902 to operation 904.

At operation 904, a number of dashboard layout options are provided to the subscriber. Dashboard layout options may depend on subscriber credentials (or permissions), the scorecard selection, system resources, and the like. Dashboard layout options may be provided along with a preview of available options. Processing advances from operation 904 to operation 906.

At operation 906, a dashboard layout selection is received. The dashboard layout selection may include the selected scorecard presentation along with its associated subordinate reports in a selected format. A "What You Get Is What You See" (WYSIWYG) preview may be provided upon receiving the dashboard layout selection.

At following operation 908, metadata is updated with the dashboard layout information. To instantiate, deploy, and centrally manage a dashboard independent of a web platform, layout information including links may be provided in the metadata eliminating a need to generate a separate document or documents integrating the scorecard components to form the dashboard. Processing moves from operation 98 to operation 910.

At operation 910, the dashboard is instantiated. Following instantiation of the dashboard, it may be deployed at operation 912 to one or more servers for consumption and/or further customization by end users, or to be centrally managed and only viewed by end users. After operation 912, processing moves to a calling process for further actions.

The operations included in process 900 are for illustration purposes. Automatic generation of dashboards with scorecard metrics and subordinate reporting may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for automated generation of a dashboard based on scorecard metrics, comprising:
   providing a predetermined number of dashboard layout options in response to a scorecard selection, wherein each dashboard layout option includes a scorecard presentation and at least one subordinate report;
   receiving a dashboard layout selection; and
   instantiating the dashboard based on the scorecard selection and the dashboard layout selection, wherein the layout information is included in metadata.

2. The method of claim 1, further comprising:
   receiving a location selection; and
   deploying the dashboard to the selected location.

3. The method of claim 2, further comprising providing a preview of the instantiated dashboard before deployment.

4. The method of claim 2, wherein the location defines one of a server and a place in an enterprise architecture.

5. The method of claim 2, further comprising setting permissions for subscribers upon deployment.

6. The method of claim 5, further comprising enabling a subscriber to further customize the dashboard after deployment.

7. The method of claim 1, wherein the at least one subordinate report is generated based on the scorecard selection.

8. The method of claim 1, wherein the dashboard layout selection is determined based on a subscriber credential.

9. The method of claim 1, wherein the dashboard layout selection is determined based on a set of past subscriber preferences.

10. The method of claim 1, further comprising generating a workflow upon deployment.

11. A computer-readable storage medium having computer executable instructions for generating and managing a dashboard in a business logic system, the instructions comprising:
    determining available dashboard options based on a selection of a scorecard and subordinate reports associated with the scorecard;
    instantiating a dashboard in response to receiving a dashboard selection, wherein layout information associated with the dashboard is stored in metadata; and
    deploying the dashboard to at least one location in an organizational architecture.

12. The computer-readable storage medium of claim 11, wherein the deployed dashboard is one of centrally managed using the layout information in the metadata and locally customized by a subscriber.

13. The computer-readable storage medium of claim 11, wherein the location includes a server.

14. The computer-readable storage medium of claim 11, wherein determining the dashboard options includes dynamically determining size and placement of the scorecard presentation and the subordinate reports based on a type and number of the subordinate reports.

15. The computer-readable storage medium of claim 11, wherein the instructions further include providing a link in the deployed dashboard for a subscriber to activate actions associated with a business process whose performance the scorecard measures.

16. A system for generating a dashboard based on a scorecard and subordinate reports, comprising:
    a scorecard application configured to compute scorecard metrics and provide a scorecard presentation based on the computed scorecard metrics;
    a reporting application configured to provide at least one subordinate report based on the scorecard presentation; and
    a dashboard module configured to:
    present a predetermined number of dashboard layout options, wherein each dashboard layout option includes a scorecard presentation and at least one subordinate report;
    receive a dashboard layout selection; and
    instantiate the dashboard based on the dashboard layout selection, wherein the layout information is included in metadata.

17. The system of claim 16, wherein the dashboard module is further configured to deploy the dashboard to at least one location such that further customization can be performed using the metadata.

18. The system of claim 16, wherein the dashboard module is further configured to deploy the dashboard to a plurality of locations, and wherein the dashboard is centrally managed using the layout information in the metadata.

19. The system of claim 16, wherein the dashboard layout options are determined based on the scorecard presentation and a number and types of subordinate reports to be included in the dashboard.

20. The system of claim 16, wherein the dashboard module is integrated with the scorecard application.

* * * * *